(12) United States Patent
Linden et al.

(10) Patent No.: US 10,941,603 B2
(45) Date of Patent: *Mar. 9, 2021

(54) POWERED DRIVEN DOOR PRESENTER FOR VEHICLE DOORS

(71) Applicant: Ford Global Technologies, LLC, Dearborn, MI (US)

(72) Inventors: H. Paul Tsvi Linden, Southfield, MI (US); Christopher Matthew Radjewski, Macomb, MI (US); Constantin Manolescu, Rochester Hills, MI (US); James Parsons Sullivan, Grosse Pointe, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/815,319

(22) Filed: Mar. 11, 2020

(65) Prior Publication Data
US 2020/0208457 A1 Jul. 2, 2020

Related U.S. Application Data

(60) Division of application No. 16/113,137, filed on Aug. 27, 2018, now Pat. No. 10,697,224, which is a (Continued)

(51) Int. Cl.
*E06B 3/00* (2006.01)
*E05F 15/616* (2015.01)
(Continued)

(52) U.S. Cl.
CPC .............. *E05F 15/616* (2015.01); *B60J 1/08* (2013.01); *B60J 5/047* (2013.01); *B60R 25/24* (2013.01);
(Continued)

(58) Field of Classification Search
CPC .......... E05B 81/20; E05B 81/14; E05B 81/56; E05B 81/70; E05B 81/10; B60J 1/08;
(Continued)

(56) References Cited

U.S. PATENT DOCUMENTS

| 2,553,023 A | 5/1951 | Walters |
| 3,605,459 A | 9/1971 | Van Dalen |

(Continued)

FOREIGN PATENT DOCUMENTS

| CN | 2683455 Y | 3/2005 |
| CN | 1232936 C | 12/2005 |

(Continued)

*Primary Examiner* — Jerry E Redman
(74) *Attorney, Agent, or Firm* — David L. Coppiellie; Price Heneveld LLP

(57) ABSTRACT

A vehicle includes a body and a door that is movably mounted to the body. The door has a powered latch and an electrically-powered actuator that extends and retracts a plunger from an inner side of the door. A controller unlatches the powered latch and actuates the electrically-powered actuator such that the plunger contacts the body and pushes the door open. The controller then controls the electrically-powered actuator to retract the plunger while the door is open.

9 Claims, 7 Drawing Sheets

Related U.S. Application Data continuation of application No. 15/228,101, filed on Aug. 4, 2016, now Pat. No. 10,087,671.

(51) Int. Cl.

| | | |
|---|---|---|
| *E05B 81/20* | (2014.01) | |
| *B60J 1/08* | (2006.01) | |
| *B60J 5/04* | (2006.01) | |
| *B60R 25/24* | (2013.01) | |
| *E05B 81/14* | (2014.01) | |
| *E05B 81/56* | (2014.01) | |
| *E05B 81/70* | (2014.01) | |
| *E05B 85/10* | (2014.01) | |

(52) U.S. Cl.
CPC ............. *E05B 81/14* (2013.01); *E05B 81/20* (2013.01); *E05B 81/56* (2013.01); *E05B 81/70* (2013.01); *E05B 85/10* (2013.01); *E05Y 2201/22* (2013.01); *E05Y 2201/426* (2013.01); *E05Y 2201/434* (2013.01); *E05Y 2201/622* (2013.01); *E05Y 2201/686* (2013.01); *E05Y 2400/31* (2013.01); *E05Y 2400/40* (2013.01); *E05Y 2900/531* (2013.01); *E05Y 2900/55* (2013.01)

(58) Field of Classification Search
CPC .................. B60J 5/047; E05Y 2201/22; E05Y 2201/426; E05Y 2201/686
USPC ................................................... 49/364, 506
See application file for complete search history.

(56) References Cited

U.S. PATENT DOCUMENTS

| | | | |
|---|---|---|---|
| 3,771,823 | A | 11/1973 | Schnarr |
| 4,640,050 | A | 2/1987 | Yamagishi et al. |
| 4,674,230 | A | 6/1987 | Takeo et al. |
| 4,703,963 | A | 11/1987 | Ball |
| 4,867,501 | A | 9/1989 | Nomura et al. |
| 5,074,073 | A | 12/1991 | Zwebner |
| 5,092,637 | A | 3/1992 | Miller |
| 5,173,991 | A | 12/1992 | Carswell |
| 5,239,779 | A | 8/1993 | DeLand et al. |
| 5,263,762 | A | 11/1993 | Long et al. |
| 5,551,187 | A | 9/1996 | Brouwer et al. |
| 5,583,405 | A | 12/1996 | Sai et al. |
| 5,613,716 | A | 3/1997 | Cafferty |
| 5,632,120 | A | 5/1997 | Shigematsu et al. |
| 5,684,470 | A | 11/1997 | DeLand et al. |
| 5,755,059 | A | 5/1998 | Schap |
| 5,895,089 | A | 4/1999 | Singh et al. |
| 5,898,536 | A | 4/1999 | Won |
| 5,979,754 | A | 11/1999 | Martin et al. |
| 6,075,298 | A | 6/2000 | Maue et al. |
| 6,091,162 | A | 7/2000 | Williams, Jr. |
| 6,145,918 | A | 11/2000 | Wilbanks, II |
| 6,305,737 | B1 | 10/2001 | Corder et al. |
| 6,338,536 | B1 * | 1/2002 | Ueno ................ E05B 17/0033 312/405 |
| 6,341,448 | B1 | 1/2002 | Murray et al. |
| 6,357,803 | B1 * | 3/2002 | Lorek ................... E05C 19/022 292/124 |
| 6,405,485 | B1 | 6/2002 | Itami et al. |
| 6,406,073 | B1 | 6/2002 | Watanabe |
| 6,481,056 | B1 | 11/2002 | Jesse |
| 6,515,377 | B1 | 2/2003 | Ubelein et al. |
| 6,659,515 | B2 | 12/2003 | Raymond et al. |
| 6,794,837 | B1 | 9/2004 | Whinnery et al. |
| 6,910,302 | B2 | 6/2005 | Crawford |
| 6,979,046 | B2 | 12/2005 | Moriyama et al. |
| 7,038,414 | B2 | 5/2006 | Daniels et al. |
| 7,170,253 | B2 | 1/2007 | Spurr et al. |
| 7,342,373 | B2 | 3/2008 | Newman et al. |
| 7,686,378 | B2 | 3/2010 | Gisler et al. |
| 7,688,179 | B2 | 3/2010 | Kurpinski et al. |
| 8,028,375 | B2 | 10/2011 | Nakaura et al. |
| 8,162,360 | B2 | 4/2012 | Takaya et al. |
| 8,169,317 | B2 | 5/2012 | Lemerand et al. |
| 8,193,462 | B2 | 6/2012 | Zanini et al. |
| 8,272,165 | B2 | 9/2012 | Tomioka |
| 8,451,087 | B2 | 5/2013 | Krishnan et al. |
| 8,584,402 | B2 | 11/2013 | Yamaguchi |
| 8,601,903 | B1 | 12/2013 | Klein et al. |
| 8,616,595 | B2 | 12/2013 | Wellborn, Sr. et al. |
| 8,690,204 | B2 | 4/2014 | Lang et al. |
| 8,991,227 | B2 | 3/2015 | Muller et al. |
| 9,003,707 | B2 * | 4/2015 | Reddmann ............... E05F 15/60 49/278 |
| 9,156,335 | B1 | 10/2015 | Harter et al. |
| 9,159,219 | B2 | 10/2015 | Magner et al. |
| 9,322,204 | B2 | 4/2016 | Suzuki |
| 9,353,566 | B2 | 5/2016 | Miu et al. |
| 9,382,741 | B2 | 7/2016 | Konchan et al. |
| 9,475,369 | B2 | 10/2016 | Sugiura et al. |
| 9,481,325 | B1 | 11/2016 | Lange |
| 9,493,975 | B1 | 11/2016 | Li |
| 9,522,590 | B2 | 12/2016 | Fujimoto et al. |
| 9,777,528 | B2 | 10/2017 | Elie et al. |
| 9,797,178 | B2 | 10/2017 | Elie et al. |
| 9,797,181 | B2 | 10/2017 | Wheeler et al. |
| 10,087,671 | B2 | 10/2018 | Linden et al. |
| 10,227,810 | B2 | 3/2019 | Linden et al. |
| 10,329,823 | B2 | 6/2019 | Khan et al. |
| 10,458,171 | B2 | 10/2019 | Khan et al. |
| 10,697,224 | B2 * | 6/2020 | Linden ..................... B60J 5/047 |
| 2003/0038544 | A1 | 2/2003 | Spurr |
| 2003/0216817 | A1 | 11/2003 | Pudney |
| 2004/0061462 | A1 | 4/2004 | Bent et al. |
| 2005/0173886 | A1 | 8/2005 | Leitner |
| 2007/0089527 | A1 | 4/2007 | Shank et al. |
| 2007/0090654 | A1 | 4/2007 | Eaton |
| 2008/0143139 | A1 | 6/2008 | Bauer et al. |
| 2008/0296927 | A1 | 12/2008 | Gisler et al. |
| 2008/0307711 | A1 | 12/2008 | Kern et al. |
| 2009/0146668 | A1 | 6/2009 | Wuerstlein |
| 2009/0146827 | A1 | 6/2009 | Wuerstlein et al. |
| 2009/0256578 | A1 | 10/2009 | Wuerstlein et al. |
| 2010/0050787 | A1 | 3/2010 | Abert et al. |
| 2010/0156440 | A1 | 6/2010 | Weingartner et al. |
| 2010/0235057 | A1 | 9/2010 | Papanikolaou et al. |
| 2011/0203181 | A1 | 8/2011 | Magner et al. |
| 2011/0254292 | A1 * | 10/2011 | Ishii ..................... E05F 5/027 292/341.15 |
| 2011/0259661 | A1 | 10/2011 | Thiele et al. |
| 2012/0180394 | A1 | 7/2012 | Shinohara |
| 2012/0192489 | A1 | 8/2012 | Pribisic |
| 2013/0138303 | A1 | 5/2013 | McKee et al. |
| 2014/0000165 | A1 | 1/2014 | Patel et al. |
| 2014/0015637 | A1 | 1/2014 | Dassanayake et al. |
| 2014/0053370 | A1 | 2/2014 | Tseng et al. |
| 2014/0150581 | A1 | 6/2014 | Scheuring et al. |
| 2014/0245666 | A1 | 9/2014 | Ishida et al. |
| 2015/0059250 | A1 | 3/2015 | Miu et al. |
| 2015/0240548 | A1 | 8/2015 | Bendel et al. |
| 2015/0283886 | A1 | 10/2015 | Nania |
| 2015/0330114 | A1 | 11/2015 | Linden et al. |
| 2015/0330117 | A1 | 11/2015 | Van Wiemeersch et al. |
| 2015/0330133 | A1 | 11/2015 | Konchan et al. |
| 2015/0360545 | A1 | 12/2015 | Nania |
| 2016/0273255 | A1 | 9/2016 | Suzuki et al. |
| 2017/0022742 | A1 | 1/2017 | Seki et al. |
| 2017/0030737 | A1 | 2/2017 | Elie et al. |
| 2017/0058588 | A1 | 3/2017 | Wheeler et al. |
| 2017/0089115 | A1 | 3/2017 | Wang et al. |
| 2017/0247927 | A1 | 8/2017 | Elie et al. |
| 2017/0306662 | A1 | 10/2017 | Och et al. |
| 2018/0038146 | A1 | 2/2018 | Linden et al. |
| 2018/0038147 | A1 | 2/2018 | Linden et al. |
| 2018/0058128 | A1 | 3/2018 | Khan et al. |
| 2018/0080270 | A1 | 3/2018 | Khan et al. |
| 2018/0363354 | A1 | 12/2018 | Linden et al. |

(56) References Cited

U.S. PATENT DOCUMENTS

2019/0078361 A1   3/2019  Worden et al.
2019/0203508 A1*  7/2019  Harajli .................... E05B 81/20
2019/0376324 A1  12/2019  Walawender et al.

FOREIGN PATENT DOCUMENTS

| | | |
|---|---|---|
| CN | 201198681 Y | 2/2009 |
| CN | 201567872 U | 9/2010 |
| CN | 201915717 U | 8/2011 |
| CN | 202200933 U | 4/2012 |
| CN | 202686247 U | 1/2013 |
| CN | 203237009 U | 10/2013 |
| CN | 203783335 U | 8/2014 |
| CN | 204326814 U | 5/2015 |
| CN | 103195324 B | 6/2015 |
| CN | 204899549 U | 12/2015 |
| DE | 10309821 A1 | 9/2004 |
| DE | 102006040211 A1 | 3/2008 |
| DE | 102006041928 A1 | 3/2008 |
| EP | 1944436 A2 | 7/2008 |
| FR | 2698838 B1 | 1/1995 |
| FR | 2841285 A1 | 12/2003 |
| FR | 2860261 A1 | 4/2005 |
| FR | 2898632 A1 | 9/2007 |
| FR | 2948402 A1 | 1/2011 |
| JP | 2006152780 A | 6/2006 |
| JP | 2007100342 A | 4/2007 |
| JP | 2007138500 A | 6/2007 |
| WO | 2015064001 A1 | 5/2015 |
| WO | 2015145868 A1 | 10/2015 |
| WO | 2017160787 A1 | 9/2017 |

* cited by examiner

POWERED DRIVEN DOOR PRESENTER FOR VEHICLE DOORS

CROSS-REFERENCED TO RELATED APPLICATIONS

This application is a Divisional of U.S. patent application Ser. No. 16/113,137, filed Aug. 27, 2018, now U.S. Pat. No. 10,697,224, which is a Continuation of U.S. Pat. No. 10,087,671, issued on Oct. 2, 2018, both of which are entitled "POWERED DRIVEN DOOR PRESENTER FOR VEHICLE DOORS," the entire disclosure of each are hereby incorporated by reference.

BACKGROUND OF THE INVENTION

Various vehicle door latching and opening mechanisms have been developed. For example, passive entry passive start (PEPS) systems typically include a wireless "fob" that transmits a security code to a vehicle. When a user carrying an authorized fob approaches a vehicle, the user can then insert a hand into an opening adjacent the handle. A sensor detects the user's hand and unlocks the vehicle door. The user then grasps the handle and moves the handle outwardly to unlatch and open the door. In this type of an arrangement, the handle is mechanically connected to a pawl in the door latch mechanism such that movement of the handle mechanically shifts the pawl to a release position to allow a claw or catch of the latch to move and disengage a striker to permit the vehicle door to be opened.

Powered door latch mechanisms have also been developed. Powered door latch mechanisms may include a powered actuator that shifts a pawl to permit movement of the claw to disengage a striker. Thus, in a powered door latch, movement of a door handle is not required because the powered actuator shifts the pawl to a released position to permit the door to be opened. Powered latches may include a lock mechanism or lock state requiring receipt of an authorized code and/or other inputs to unlock the powered latch prior to unlatching the powered latch. Known vehicle doors with powered latches include an exterior handle on the door whereby a user can grasp the handle to manually open the door after the door is unlatched.

SUMMARY OF THE INVENTION

One aspect of the present disclosure is an apparatus including a vehicle door that does not have an exterior handle. The vehicle door includes a first side edge portion that is configured to be pivotably mounted to a vehicle body structure, and a second side edge portion opposite the first side edge portion. The vehicle door handle includes a powered latch mechanism having a first electrically-powered actuator that can be actuated to unlatch the latch mechanism to permit the vehicle door to be opened. The vehicle door also includes an outer side that is free of an exterior door handle. The vehicle door also includes a powered door presenter mechanism that includes a plunger and a second electrically-powered actuator that can be actuated to shift the plunger between retracted and extended positions. The plunger engages the vehicle body and pushes the door to a partially open position to define a gap between the second side edge portion and a vehicle body whereby a user can insert a portion of a hand and pull the door to a fully open position. The apparatus further includes a controller that may be mounted in the door. Alternatively, the controller may be mounted in the main vehicle. The controller is configured to actuate the first electrically-powered actuator to unlatch the latch mechanism. The controller is also configured to actuate the second electrically-powered actuator a first time to shift the plunger from the retracted position to the extended position to partially open the vehicle door. The controller is also configured to actuate the second electrically-powered actuator a second time to shift the plunger from the extended position to the retracted position while the door is open. After the plunger is retracted, the door can be closed without interference from the plunger.

Another aspect of the present disclosure is a vehicle including a body and a door that is movably mounted to the body. The door has a powered latch and an electrically-powered actuator that extends and retracts a plunger from an inner side of the door. The vehicle also includes a controller that unlatches the powered latch and actuates the electrically-powered actuator such that the plunger contacts the body and pushes the door open, followed by actuating the electrically-powered actuator to retract the plunger.

Another aspect of the present disclosure is a method of opening a vehicle door from outside the vehicle without grasping an exterior handle of the vehicle. The method includes causing a powered door latch to unlock and to unlatch. The method further includes causing an electrically-powered actuator on the door to actuate and extend a plunger from an inner side of the door such that the plunger pushes on a body of the vehicle and at least partially opens the door to form a gap between an edge of the door and a body of the vehicle. A user then inserts a portion of a hand into the gap and pulls on the door to move the door further open. The method further includes causing the electrically-powered actuator on the door to actuate and retract the plunger while the door is open.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
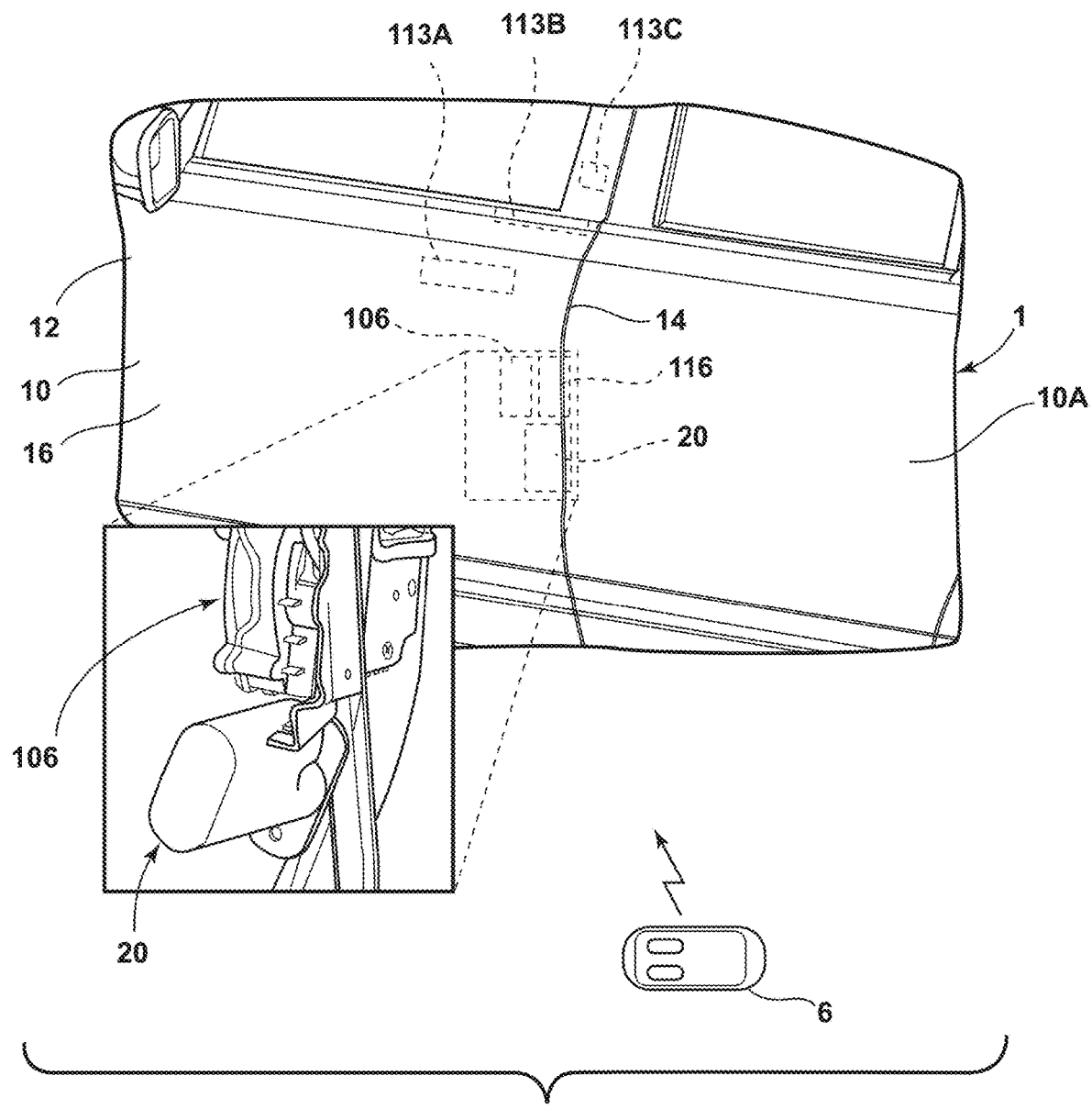
FIG. 1 is a partially fragmentary isometric view of a vehicle door in a closed position.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

With reference to FIG. 1, a motor vehicle 1 includes first (front) and second (rear) doors 10 and 10A, respectively. The vehicle 1 may include additional doors on an opposite side of the vehicle (not shown). One or more of the vehicle doors 10, 10A, etc. may include a powered door presenter mechanism 20. As discussed in more detail below, door 10 may also include a powered latch mechanism 106 having a controller 116. An outside release switch 113 (see also FIG. 5) is operably connected to the controller 116. The exterior unlatch switch 113 may be mounted in various locations as shown by the dashed lines 113A, 113B, and 113C of FIG. 1. The unlatch switch 113 may comprise a conventional movable switch member, a touch sensor, or a capacitive sensor. As discussed in more detail below in connection with FIGS. 5-7, a user actuates the powered latch 106 by actuation of switch 113 to thereby unlatch the powered latch mechanism 106. The powered latch mechanism may be configured to communicate with a wireless device 6. The wireless device 6 may comprise a conventional fob, or the wireless device 6 may comprise a smart phone that is programmed to communicate with the controller 116 of powered latch mechanism 106. The controller 116 may be configured to require receipt of an authorized security code from wireless device 6 prior to unlatching the powered latch 106. Thus, if a user actuates the switch 113, controller 116 does not unlatch powered latch 106 unless an authorized security code has been received from a wireless device 6.

Referring again to FIG. 1, the vehicle door 10 includes a first (front) edge portion 12 that is rotatably mounted to a vehicle body structure 103 (see also FIG. 5) by hinges 104A, 104B, or the like. The door 10 also includes a second (rear) side edge portion 14 that is opposite the first side edge portion 12. As discussed in more detail below, the powered latch mechanism 106 of the vehicle door 10 includes a first electrically-powered actuator such as an electric motor 192 (FIG. 6) that can be actuated to unlatch the latch mechanism 106 to permit the vehicle door 10 to be opened. As shown in FIG. 1, the outer side 16 of the vehicle door 10 is free of an exterior door handle. Also, the outer side 16 of door 10 does not include a pocket or other feature for grasping door 10 when door 10 is in the closed position of FIG. 1.

The vehicle door 10 also includes powered door presenter mechanism 20. As discussed in more detail below in connection with FIGS. 3 and 4, the powered door presenter mechanism 20 includes a plunger 22 and a second electrically-powered actuator such as an electric motor 24 that can be actuated to shift the plunger 22 between a retracted position (FIG. 3) and an extended position (FIG. 4). The vehicle door 10 also includes a controller such as the latch controller 116 that is configured to actuate the first electrically-powered actuator (e.g. electric motor 192) to unlatch the powered latch mechanism 106. The controller 116 is also configured to actuate the second electrically-powered actuator (e.g. electric motor 24) to shift the plunger 22 from the retracted position (FIG. 3) to the extended position (FIG. 4) to at least partially open the vehicle door 10 to form a gap 26 (FIG. 2) between edge 14 of vehicle door 10 and an adjacent surface 28. The adjacent surface 28 may comprise a forward edge of a rear door 10A. Alternatively, the surface 28 may comprise a surface of the vehicle body structure 103. The controller 116 is also configured to shift the plunger from the extended position (FIG. 4) to the retracted position (FIG. 3) when the door 10 is open. Because the plunger 22 is retracted while the door 10 is in an open position, a user can close the door without interference from the plunger 22.

Figure 3:
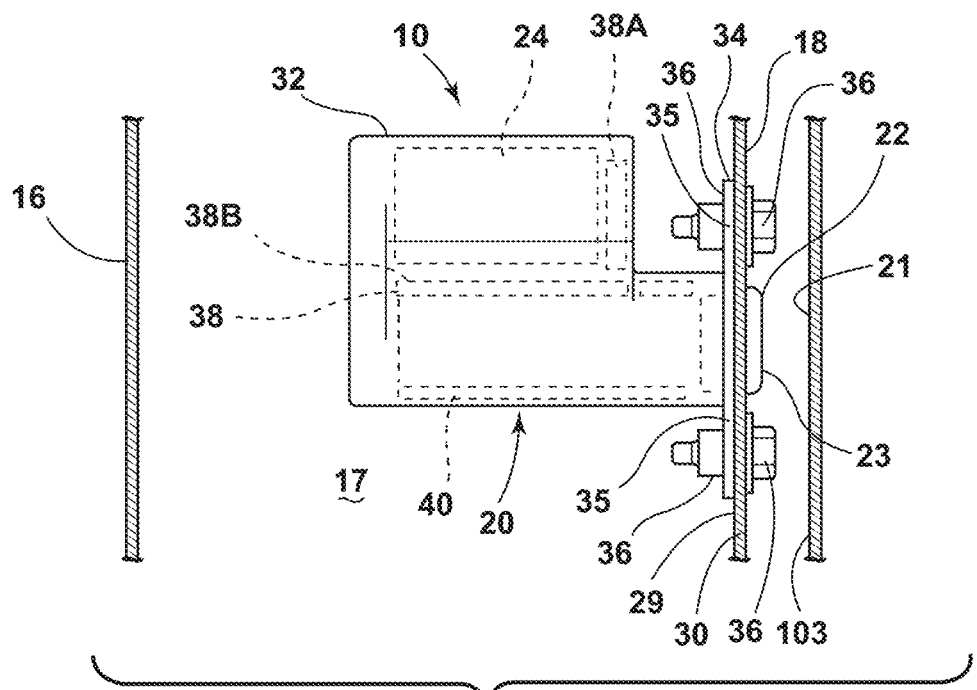
FIG. 3 is a partially fragmentary view of a powered door presenter mechanism showing a plunger in a retracted position.
Figure 4:
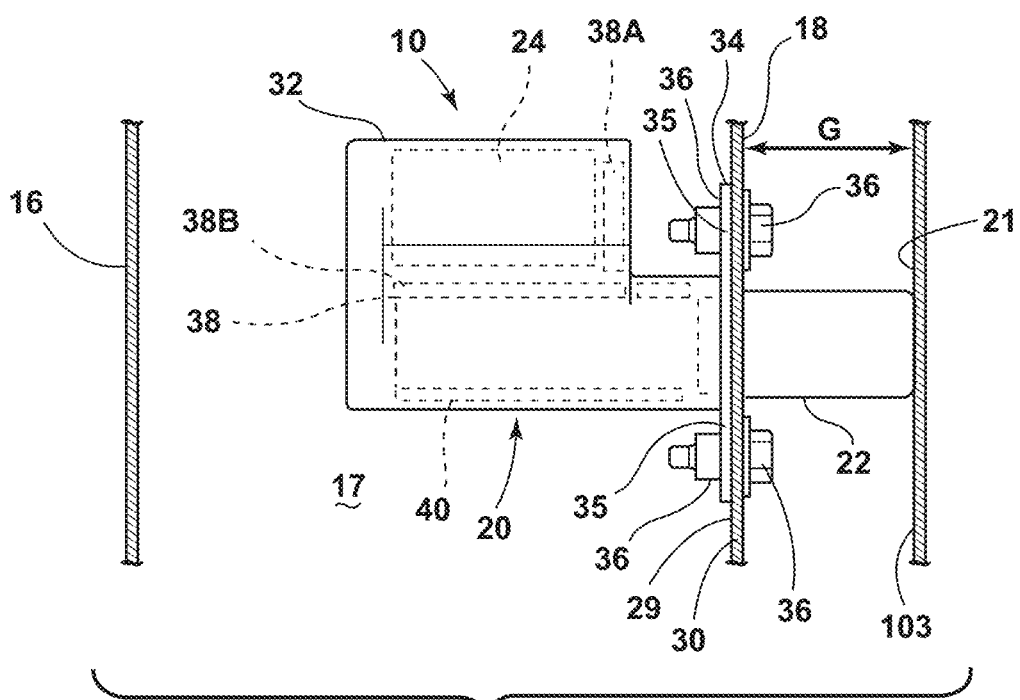
FIG. 4 is a partially fragmentary view of a powered door presenter mechanism showing a plunger in an extended position.
Figure 7:
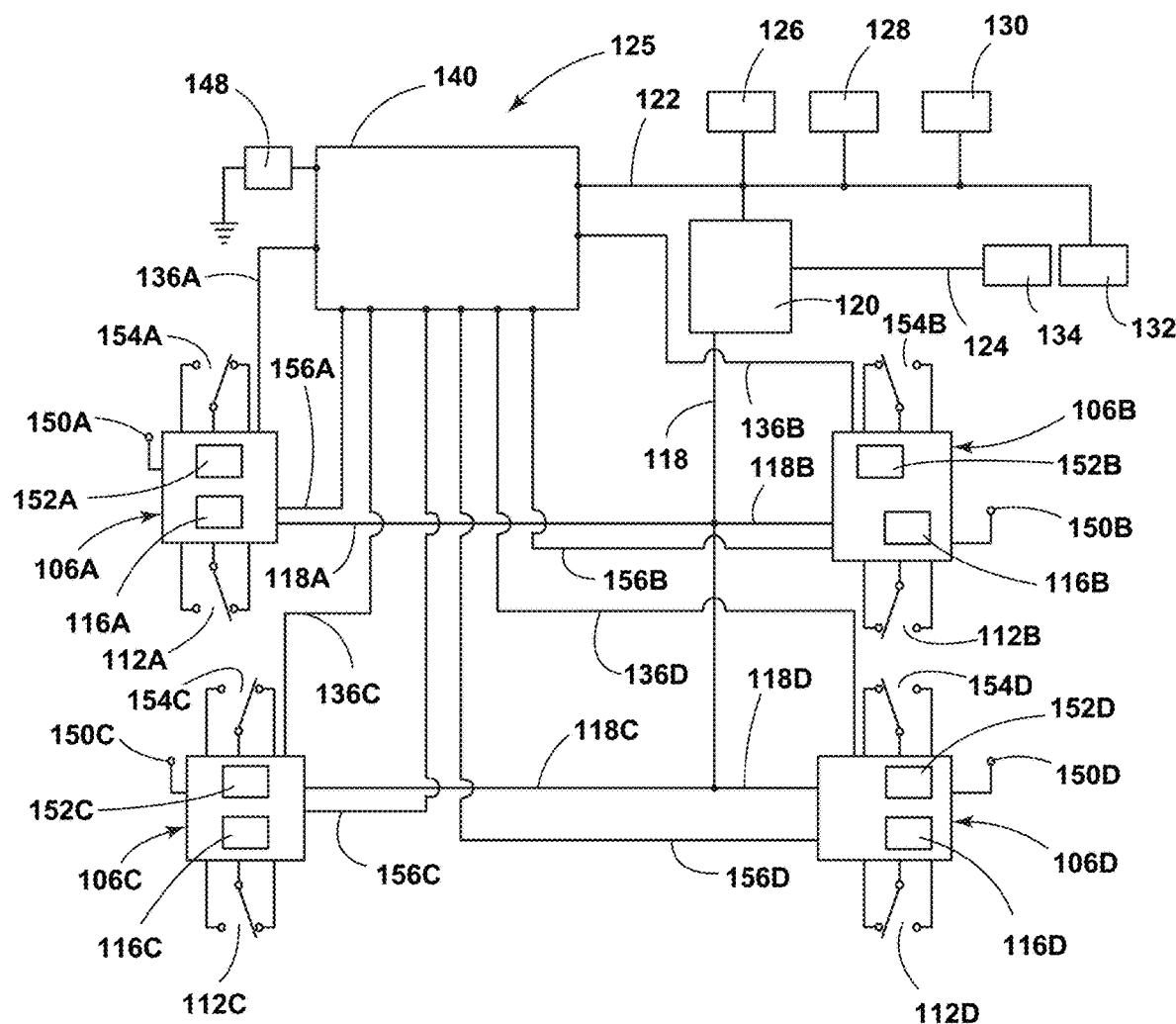
FIG. 7 is a schematic view of a control system and powered latch mechanism.

With reference to FIGS. 3 and 4, powered door presenter mechanism 20 includes a housing 32 and a mounting bracket or plate 34. The powered door presenter mechanism 20 is mounted to an inner side 29 of door structure 30 by threaded fasteners 36 that extend through openings 35 in bracket or plate 34. When installed, the powered door presenter mechanism 20 is disposed in an interior space 17 of door 10. Interior space 17 is defined between outer side 16 and inner side 18 of door 10. The electric motor 24 is operably connected to the plunger 22 by a gear drive 38 or other suitable arrangement. In the illustrated example, gear drive 38 includes a rotating gear 38A that engages a rack 38B on plunger 22. However, it will be understood that various gear drive arrangements may be utilized. The plunger 22 reciprocates between a retracted position FIG. 3 and an extended position FIG. 4. Electric motor 24 can be actuated to shift the plunger from the retracted position to the extended position, and the electric motor 24 can also be actuated to shift the plunger 22 from the extended position (FIG. 4) to the retracted position (FIG. 3). The electric motor 24 may be operably connected to a controller 116A-116D and backup power supply 152A-152D of a powered latch 106A-106D (FIG. 7). It will be understood that a solenoid or other suitable powered actuator may be utilized instead of electric motor 24. For example, plunger 22 may be biased to an open or closed position by a spring, and a solenoid may be actuated to overcome the bias and shift plunger 22. Accordingly, it will be understood that controller 16 may provide for powered actuation of plunger 22 in extended and retracted directions by controlling a powered one-way actuator in connection with a spring.

The powered door presenter mechanism 20 also includes one or more sensors 40 that provide a signal to the latch controller 116 concerning the position of plunger 22. The sensors 40 may comprise one or more Hall effect sensors and/or micro switches. The Hall effect sensors provide vehicle-specific electrical current versus travel (Hall count) profiles that are stored in the controller 116. This data may be used by controller 116 to determine (or learn) the full travel position of plunger 22 (FIG. 4).

Figure 5:
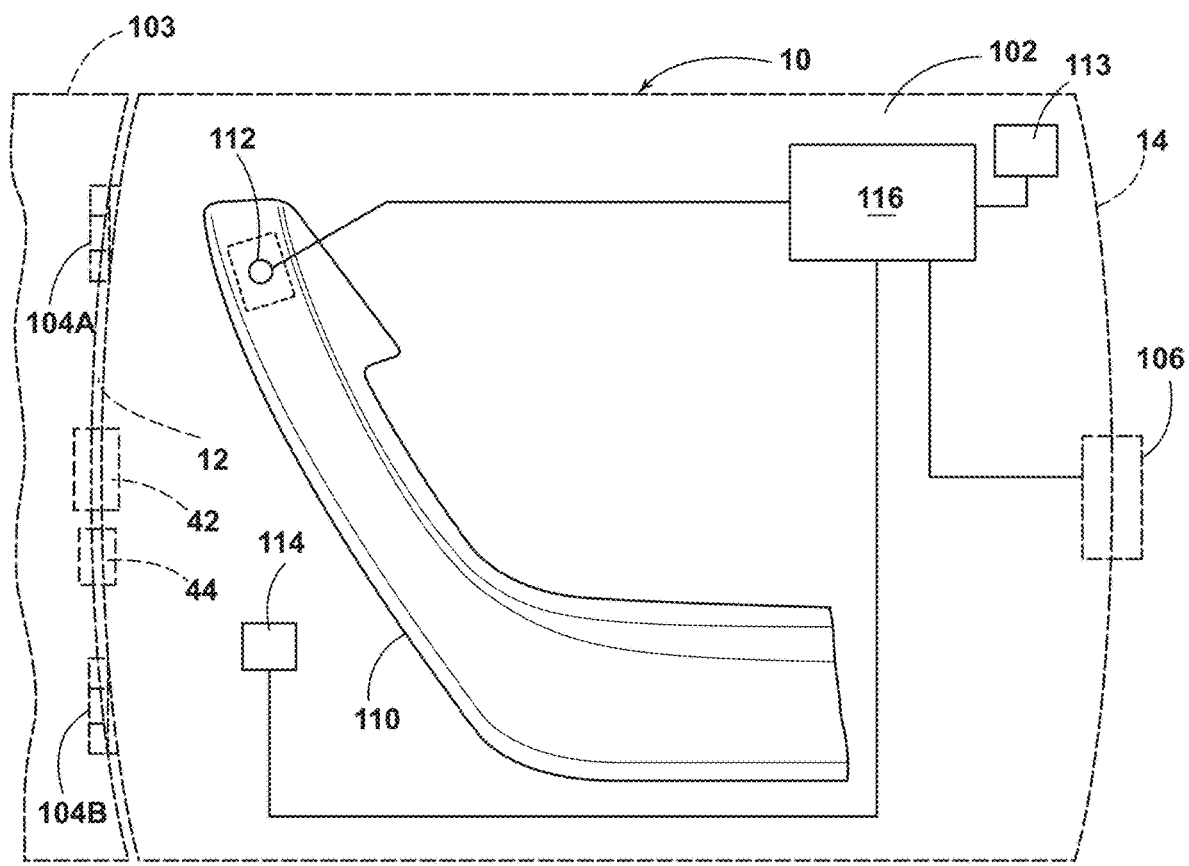
FIG. 5 is a partially schematic view of a vehicle door.

The vehicle door 10 may also include a door strap detent mechanism 42 (FIG. 5). The door strap mechanism 42 provides one or more detents or checks to thereby retain the door 10 at one or more specific, predefined partially opened positions and/or a fully open position. In general, the door 10 tends to remain stationary at a check or detent position. However, if a user applies sufficient force to door 10, the door 10 can be moved in opened or closed directions away from the detent. The detent mechanism 42 may have a check or detent position that corresponds to the fully extended position of plunger 22 (FIG. 4). Thus, the detent mechanism 42 tends to retain door 10 in a first check position corresponding to the position shown in FIG. 4. Various types of door strap (detent) mechanisms are generally known in the art, such that a detailed description of detent mechanism 42 is not believed to be required.

As discussed in more detail below, after the electric motor 24 is initially actuated to partially open door 10 by shifting plunger 22 from the retracted position (FIG. 3) to the extended position (FIG. 4), the electric motor 24 is then actuated to retract plunger 22 back to the retracted position (FIG. 3). The check or detent provided by mechanism 42 tends to retain the door 10 in the first check position of (FIG. 4) even after the plunger is retracted (FIG. 3). An angular position sensor 44 (FIG. 5) may be operably connected to latch controller 116. The sensor 44 provides a signal indicating the angular position of door 10 relative to the vehicle body structure 103. Controller 116 may be configured to retract plunger 22 only if door 10 has been rotated open to or past the first check position of FIG. 4. This ensures that the plunger 22 is not retracted until after a user has opened the door 10 to or beyond the first check position of FIG. 4 to prevent pinching of the user's hand. It will be understood that the sensor 44 is optional, and latch controller 116 may be configured to retract plunger 22 immediately after extending plunger 22. Alternatively, controller 116 may be configured to retract plunger 22 after a predefined period of time (e.g. 3 seconds) after plunger 22 is initially shifted to the extended position of FIG. 4.

Latch controller 116 may utilize data from sensors 40 to determine if an object has been encountered. For example, if the controller 116 initially actuates the electric motor 24, and the plunger 22 begins to extend from the retracted position of FIG. 3, but the door encounters an object preventing movement of plunger 22 to the fully extended position (FIG. 4), controller 116 may be configured to retract plunger 22 even if the plunger 22 is not able to reach the fully extended position of FIG. 4. Latch controller 116 may be configured to utilize pulse width modulation (PWM) control to provide variable power to electric motor 24 to thereby control the force generated by electric motor 24 and/or the speed at which plunger 22 is extended and/or retracted. Controller 116 may be configured to shift plunger 22 at a predefined, constant target velocity by increasing or decreasing the electric power supply to the electric motor 24 as required to maintain the target velocity. If the door 10 encounters an object requiring increased power to maintain the speed of plunger 22, controller 116 may be configured to retract plunger 22 if the power requirements to maintain the target speed exceed a predefined level. Also, when the door 10 is in a fully closed position, higher force may be required to initiate movement of door 10 due to ice buildup or other physical connection/friction/adhesion between door 10 and door body 103. Controller 116 may provide increased electric power to electric motor 24 during initial movement from the retracted position of FIG. 3 to provide the required increased force to initially move door 10.

Figure 2:
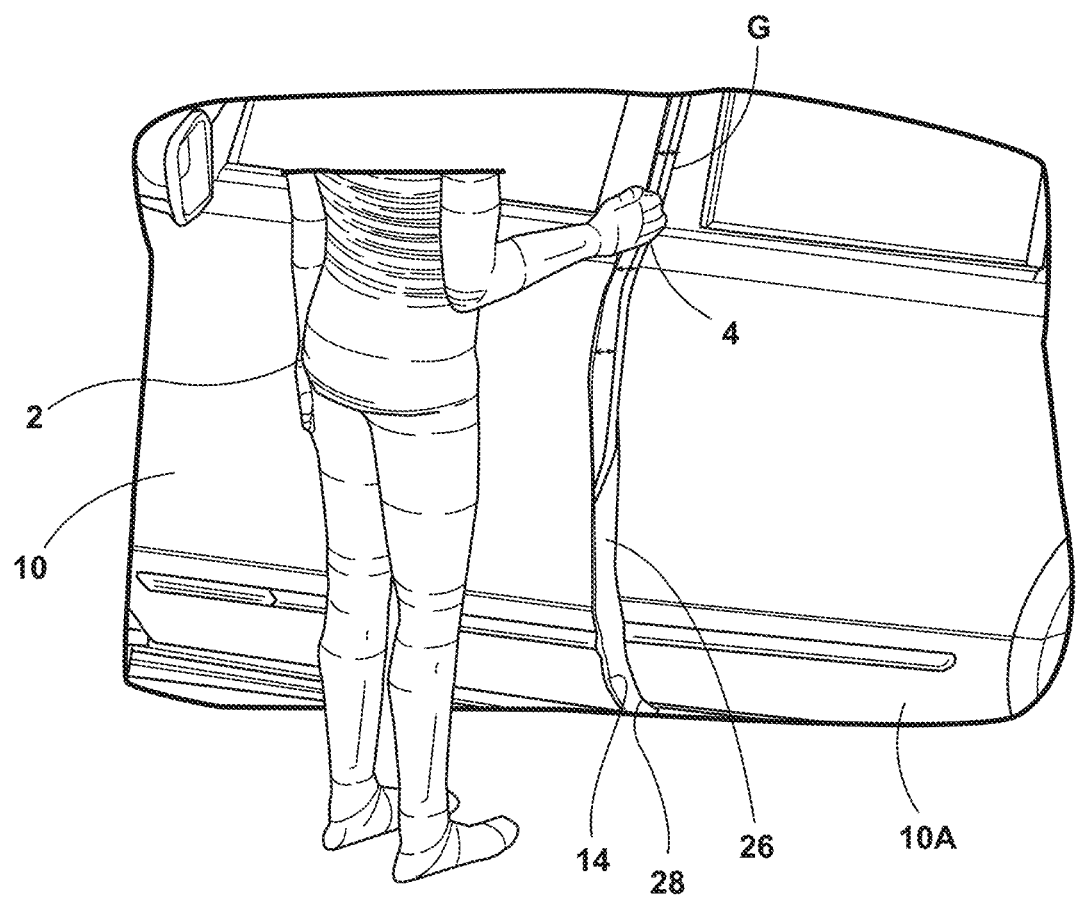
FIG. 2 is a partially fragmentary isometric view of a vehicle door in a partially opened position.

Plunger 22 may include an end surface 23 that contacts a surface 21 of vehicle body 103 to push the door 10 from the closed position (FIG. 3) to the first check position (FIG. 4). When the door 10 is in the first check position, a gap "G" is formed between inner side 18 of door 10 and vehicle body 103. The gap G is preferably large enough to allow a user 2 to insert a hand 4 of a user 2 into gap G as shown in FIG. 2. The gap "G" is preferably at least about 20 mm, and is more preferably at least about 50 mm. In general, the gap "G" may be in a range of about 20 mm to about 250 mm. Also, the travel of plunger 22 is approximately equal to the gap G. Because the interior space 17 of door 10 is limited, the length of plunger 22 and corresponding size of the gap G may be limited by space concerns.

As discussed above, the powered door presenter mechanism 20 may include a solenoid or other powered mechanism rather than an electric motor 24. Furthermore, it will be understood that plunger 22 could have other configurations, and the present invention is not limited to the specific linear plunger configuration shown and described above.

Figure 6:
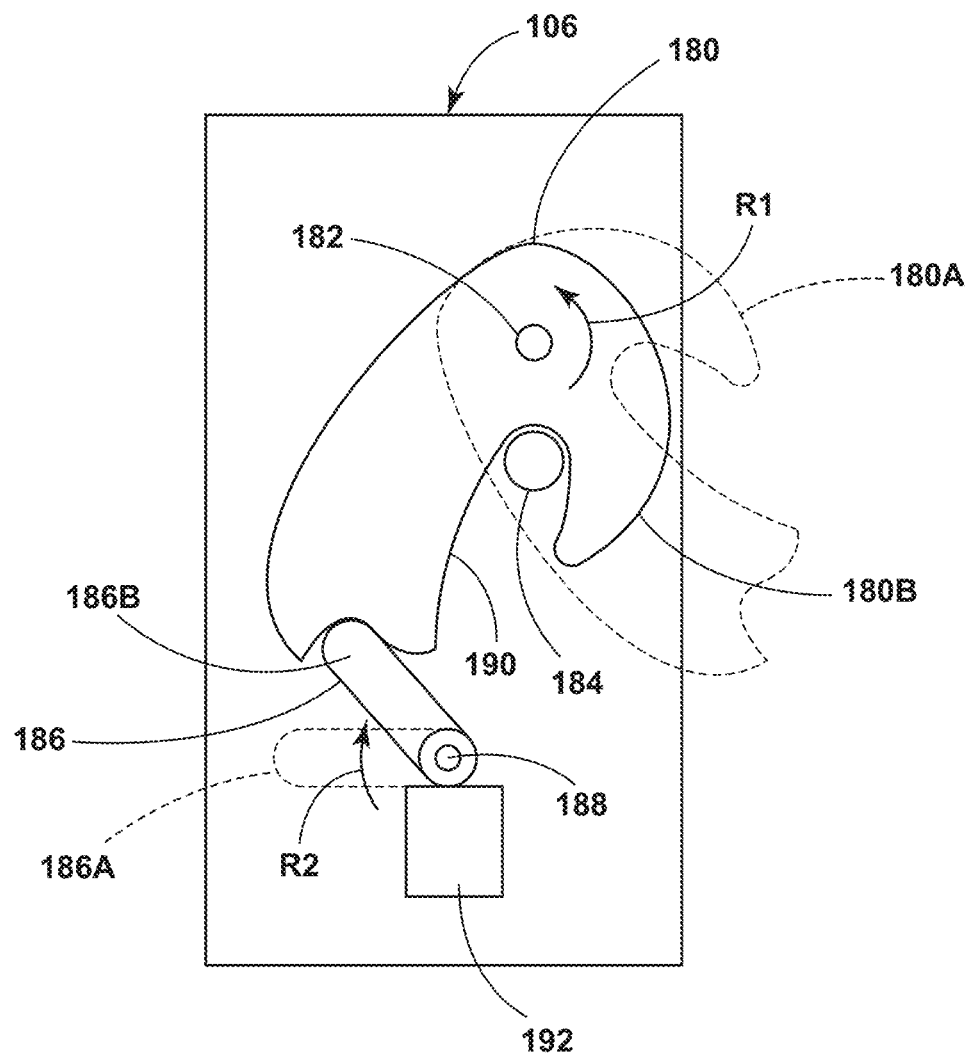
FIG. 6 is a partially schematic view of a powered latch mechanism.

With further reference to FIGS. 5-7, door 10 includes a door structure 102 that may be movably mounted to a vehicle structure 103 in a known manner utilizing hinges 104A and 104B The powered latch 106 is operably connected to latch controller 116. The controller 116 may comprise an individual control module that is part of the powered latch 106, and the vehicle 1 may include a powered latch 106 at each of the doors of vehicle 1. Door 10 may also include an interior unlatch input feature such as an interior unlatch switch 112 that is operably connected to the controller 116, and an exterior unlatch switch 113 that is also operably connected to controller 116. Interior unlatch switch 112 is disposed on an interior side of door 10 where it is accessible from inside the vehicle, and exterior unlatch switch 113 is disposed on an exterior side of door 10 and is accessible from the outside of the vehicle 1 when door 10 is closed.

To exit the vehicle 1, a user 2 actuates the interior unlatch switch 112 or exterior unlatch switch 113 to generate an unlatch request to the controller 8. If the latch 106 is unlatched and/or certain predefined operating perimeters or conditions are present, controller 116 generates a signal causing powered latch 106 to unlatch upon actuation of interior unlatch switch 112. Door 10 may also include an unlock input feature such as an unlock switch 114 that is mounted to an inner side of the door 10. The unlock switch 114 is operably connected to the controller 116. Controller 116 may be configured to store a door or latch lock or unlock state that can be changed by actuation of unlock switch 114.

To enter vehicle 1, a user 2 transmits a security code to controller 116 utilizing wireless device 6, then actuates exterior unlatch switch 113. Operation of powered door presenter 20 to enter vehicle 1 is discussed in more detail below in connection with FIG. 8.

Controller 116 may be configured (e.g. programmed) to deny an unlatch request generated by actuation of the interior unlatch switch 112 or exterior unlatch switch 113 if the controller 116 determines that the powered latch 106 is in a locked state. Controller 116 is preferably a programmable controller that can be configured to unlatch powered latch 106 according to predefined operating logic by programming controller 116. However, controller 116 may comprise electrical circuits and components that are configured to provide the desired operating logic. As used herein, the term "controller" may refer to one or more processors, circuits, electronic devices, and other such components and systems that are arranged to provide the desired control.

With further reference to FIG. 6, powered latch 106 may include a movable retaining (latch) member such as claw 180 that pivots about a pivot 182 and a pawl 186 that is rotatably mounted for rotation about a pivot 188. Pawl 186 can move between a disengaged or unlatched position 186A and a latched or engaged configuration or position 186B. In use, when door 10 is open, claw 180 will typically be in an extended position 180A. As the door 10 is closed, surface 190 of claw 180 comes into contact with a striker 184 that is mounted to the vehicle structure. Contact between striker 184 and surface 190 of claw 180 causes the claw 180 to rotate about pivot 182 in the direction of the arrow "R1" until the claw 180 reaches the closed position 180B. When claw 180 is in the closed position 180B, and pawl 186 is in the engaged position 186B, pawl 186 prevents rotation of claw 180 to the open position 180A, thereby preventing opening of door 10. Claw 180 may be biased by a spring or the like (not shown) for rotation in a direction opposite the arrow R1 such that the claw 180 rotates to the open position 180A unless pawl 186 is in the engaged position 186B. Pawl 186 may be biased by a spring or the like (not shown) in the direction of the arrow R2 such that pawl 186 rotates to the engaged position 186B as claw 180 rotates to the closed position 180B as striker 184 engages claw 180 as door 10 is closed. Latch 106 can be unlatched by rotating pawl 186 in a direction opposite the arrow R2 to thereby permit rotation of claw 180 from the closed position 180B to the open position 180A.

A powered actuator such as an electric motor 192 may be operably connected to the pawl 186 to thereby rotate the pawl 186 to the disengaged or unlatched position 186A. Controller 116 can unlatch powered latch 106 to an unlatched configuration or state by causing powered actuator 192 to rotate pawl 186 from the latched or engaged position 186B to the unlatched configuration or position 186A. However, it will be understood that various types of powered latches may be utilized, and the powered latch 106 need not include the claw 180 and powered pawl 186 as shown in FIG. 6. For example, powered actuator 192 could be operably interconnected with the claw 180 utilizing a mechanical device other than pawl 186 to thereby shift the powered latch 106 between latched and unlatched states. In general, vehicle door 10 can be pulled open if powered latch 106 is in an unlatched state, but the powered latch 106 retains the vehicle door 10 in a closed position when the powered latch 106 is in a latched state or configuration.

With further reference to FIG. 7, a latch system 125 may include a driver's side front powered latch 106A, a passenger side front powered latch 106B, a driver's side rear powered latch 106C and a rear passenger side powered latch 106D. The powered latches 106A-106D are configured to selectively retain the corresponding driver and passenger front and rear doors of vehicle 1 in a closed position. Each of the powered latches 106A-106D may include a controller 116A-116D, respectively, that is connected to a medium speed data network 118 including network lines 118A-118D. Controllers 116A-116D are preferably programmable controllers, but may comprise electrical circuits that are configured to provide the desired operating logic. The data network 118 may comprise a Medium Speed Controller Area Network ("MS-CAN") that operates according to known industry standards. Data network 118 provides data communication between the controllers 116A-116D and a digital logic controller ("DLC") gateway 120. The DLC gateway 120 is operably connected to a first data network 122, and a second data network 124. First data network 122 may comprise a first High Speed Controller Area Network ("HS1-CAN"), and the second data network 124 may comprise a second High Speed Controller Area Network ("HS2-CAN"). The data networks 122 and 124 may operate according to known industry standards. The first data network 122 is connected to an Instrument Panel Cluster ("IPC") 126, a Restraints Control Module ("RCM") 128, and a Powertrain Control Module ("PCM") 130. The RCM 128 utilizes data from acceleration sensors to determine if a crash event has occurred. The RCM 128 may be configured to deploy passenger restraints and/or turn off a vehicle's fuel supply in the vent a crash is detected. RCM 128 may be configured to generate an Emergency Notification System ("ENS") signal if a crash occurs. The ENS signal may be transmitted over one or both of the data networks 122 and 124 (preferably both). The RCM is also preferably connected ("hard wired") directly to each powered latch 106A-106D by wires (not shown) such that powered latches 106A-106D receive an ENS signal even if data networks 122 and 124 are not operational. The first high speed data network 122 may also be connected to a display screen 132 that may be positioned in a vehicle interior to provide visual displays to vehicle occupants. The second high speed data network 124 is operably connected to antilock brakes ("ABS") module 134 that includes sensors that measure a speed of the vehicle.

System 125 also includes a Body Control module ("BCM") 140 that is connected to the first high speed data network 122. The body control module 140 is also operably connected to the powered latches 106A-106D by data lines 136A-136D. Controllers 116A-116D may also be directly connected ("hardwired") to control module 140 by electrical conductors such as wires 156A-156D, respectively. Wires 156A-156D may provide a redundant data connection between controllers 116A-116D and controller 140, or the wires 156A-156D may comprise the only data connection between controllers 116A-116D and controller 140. Control module 140 may also be operably interconnected to sensors (not shown) that signal the control module 140 if the vehicle doors are ajar. Control module 140 is also connected to a main vehicle electrical power supply such as a battery 148. Each of the powered latches 106A-106D may be connected to main vehicle power supply 148 by connector's 150A-150D. The powered latches 106A-106D may also include back up power supplies 152 that can be utilized to actuate the powered actuator 192 in the event the power supply from main vehicle power supply ("VPWR") 148 is interrupted or lost. The backup power supplies 152A-152D may comprise capacitors, batteries, or other electrical energy storage devices. In general, the backup power supplies 152A-152D store enough electrical energy to provide for temporary operation of controllers 116A-116D, and to actuate the powered actuators 192 a plurality of times to permit unlatching of the vehicle doors in the event the main power supply/battery 148 fails or is disconnected.

Each of the powered latches 106A-106D is also operably connected to a two pole (for example, both poles normally opened or one pole normally opened and one pole normally closed) interior unlatch switch 112A-112D, respectively, that provide user inputs (unlatch requests). The powered latches 106A-106D are also operably connected to an exterior unlatch switches 154A-154D, respectively. Controllers 116A-116D are also operably connected to unlock switches 114 (FIG. 4). Controllers 116A-116D may be configured to store the Lock Status ("Locked" or "Unlocked") and to utilize the Lock Status for control of powered latches 106A-106D.

Figure 8:
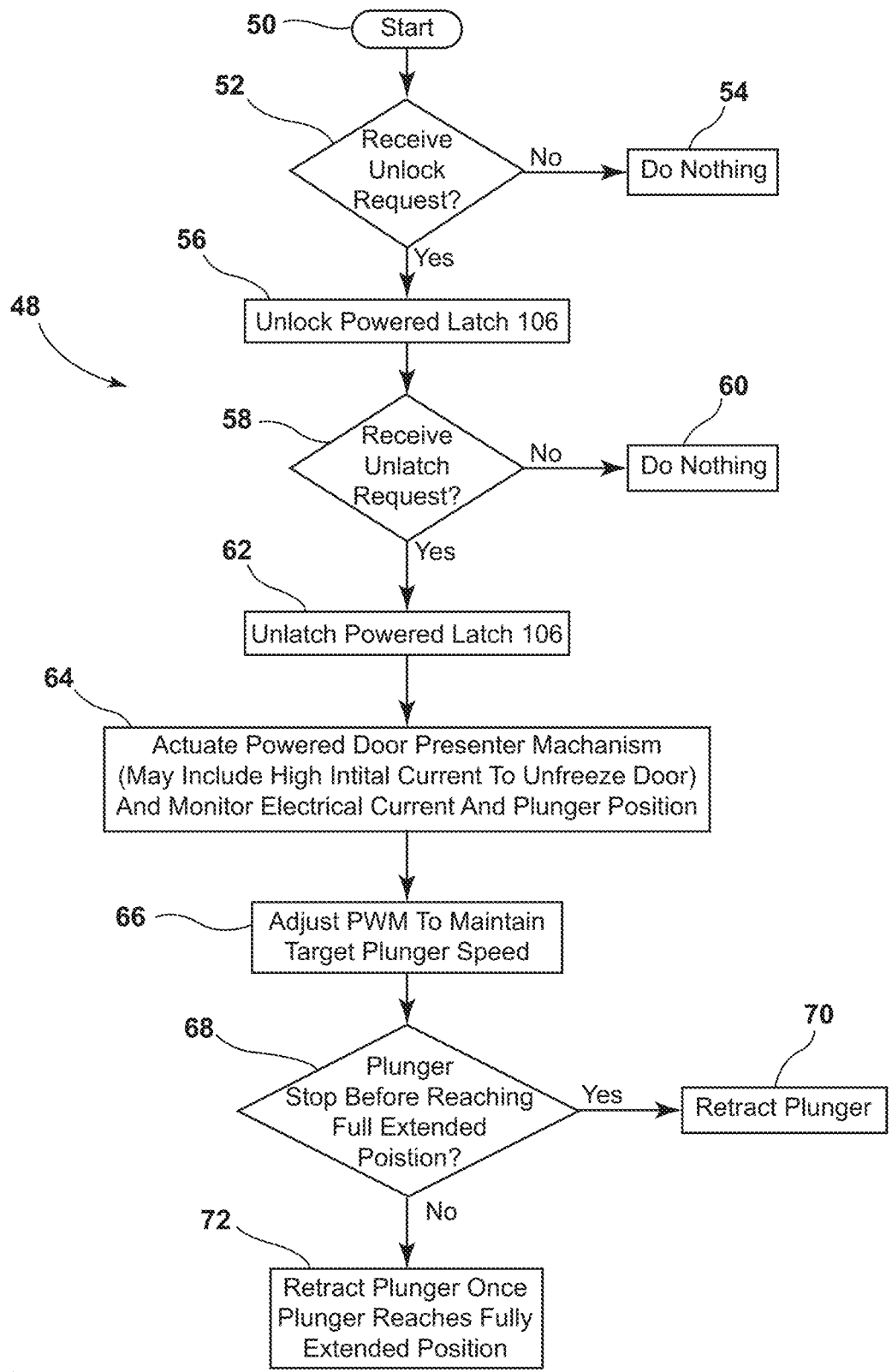
FIG. 8 is a flow chart showing operation of a powered door latch and powered door presenter.

With further reference to FIG. 8, latch controller 116 (or main vehicle controller 140) may be configured to operate according to a process 48 to permit vehicle entry. After start 50, controller 116 determines if an unlock request (e.g. a wireless security code form wireless device 6) has been received at step 52. If no unlock request has been received, controller 116 does nothing as shown at step 54. If an unlock request is received at step 52, controller 116 unlocks the powered latch 56 as shown at step 56. It will be understood that controller 116 may have stored "lock" and "unlock" states, such that the unlock step 56 may comprise changing an electrical (memory) state or "flag" in controller 116. Also, it will be understood that the latch controller 116 may be configured to require receipt of specific authorization/identification (e.g. a unique security code transmitted wirelessly by wireless device 6) prior to unlocking the powered latch 106.

If an unlatch request is received at 58, the process continues to step 62 and the powered latch 106 is unlatched (e.g. electric motor 192 (FIG. 6) is actuated)). If an unlatch request is not received at step 58, the controller 58 does not take further action. Following step 62, at step 64 the controller 116 actuates the powered door presenter mechanism by actuating electric motor 24, and the controller 116 monitors the electrical current and position of plunger 22. The process then continues to step 66, and controller 116 adjusts the pulse with modulation (PWM) as required. Controller 116 may be configured to maintain plunger 22 at a target speed, if possible. However, it will be understood that controller 116 may be configured to control plunger 22 utilizing PWM (or other suitable means) according to other predefined criteria.

As shown at step 68, if the plunger stops before reaching the fully extended position, the controller 116 retracts the plunger as shown at step 70. If the plunger 22 reaches the fully extended position (step 72), controller 116 then retracts plunger 22.

It is to be understood that variations and modifications can be made on the aforementioned structure without departing from the concepts of the present invention, and further it is to be understood that such concepts are intended to be covered by the following claims unless these claims by their language expressly state otherwise.

The invention claimed is:

1. A method of opening a vehicle door of a vehicle from outside the vehicle, the method comprising:
   causing a powered door latch to unlatch;
   causing an electrically-powered actuator on the vehicle door to actuate and extend a plunger transversely from an inner side of the vehicle door such that the plunger pushes on a body of the vehicle and partially opens the vehicle door to form a gap between an edge of the vehicle door and the body of the vehicle;
   inserting a portion of a hand into the gap and pulling on the vehicle door to move the vehicle door further open;
   causing the electrically-powered actuator on the vehicle door to actuate and retract the plunger while the vehicle door is open.

2. The method of claim 1, including:
   unlocking the powered door latch.
3. The method of claim 1, wherein:
   the vehicle door includes a forward edge that is pivotably connected to the vehicle body;
   the vehicle door includes a rearward edge that is opposite the forward edge; and
   the gap is formed between the rearward edge and the body of the vehicle.
4. The method of claim 3, wherein:
   the rearward edge is spaced apart from the body about 20 mm-250 mm when the plunger is extended.
5. The method of claim 1, wherein:
   the door includes a powered latch; and including:
   causing a controller to unlatch the powered latch;
   causing the controller to actuate the electrically-powered actuator whereby the plunger extends and retracts.
6. The method of claim 5, including:
   configuring the controller to actuate the electrically-powered actuator to provide increased force when increased force is necessary to move the door.
7. The method of claim 6, wherein;
   the plunger is movable between a retracted position and a fully extended position; and
   configuring the controller to actuate the electrically-powered actuator and retract the plunger before the plunger reaches the fully extended position when a load on the plunger exceeds a predefined maximum.
8. The method of claim 1, including:
   causing the plunger to extend and retract linearly.
9. The method of claim 1, wherein:
   the door includes a forward edge and rearward edge that is opposite the forward edge;
   the door is rotatably mounted to the body by a hinge adjacent the forward edge; and
   the electrically-powered actuator and the plunger are located directly adjacent the rearward edge of the door.

* * * * *